Aug. 29, 1967   A. ZETZSCHE   3,338,429
COUPLING DEVICE FOR TOY AND MODEL VEHICLES
Filed March 12, 1965   3 Sheets-Sheet 1

INVENTOR
Alfred Zetzsche

Aug. 29, 1967  A. ZETZSCHE  3,338,429
COUPLING DEVICE FOR TOY AND MODEL VEHICLES
Filed March 12, 1965  3 Sheets-Sheet 2

INVENTOR
Alfred Zetzsche

By
Walter Becker

INVENTOR
Alfred Zetzsche

By

Walter Becker

United States Patent Office 3,338,429
Patented Aug. 29, 1967

3,338,429
COUPLING DEVICE FOR TOY AND MODEL VEHICLES
Alfred Zetzsche, Muhlhausen uber Neumarkt, Upper Palatinate, Germany, assignor to Max Ernst, Nurnberg, Germany
Filed Mar. 12, 1965, Ser. No. 439,212
Claims priority, application Germany, Aug. 17, 1964, E 27,620
6 Claims. (Cl. 213—75)

The invention consists of a coupling device for toy and model vehicles which renders it possible not only automatically to couple driving vehicles to other vehicles in a secure manner, but also automatically to uncouple them in any position, without requiring a special additional device for this purpose. The expression "driving vehicle," as herein used, includes an auxiliary vehicle (such as a steam locomotive tender, an auxiliary vehicle for a diesel locomotive, or a loading ramp of a semi-trailer) intended, in use, to remain firmly attached to a driving vehicle proper. A vehicle to be uncoupled from a driving vehicle is hereinafter referred to as a "driven vehicle."

According to the invention, a coupling device, for toy or model vehicles, has at least one coupling element mounted for pivoting about a horizontal pivotal axis disposed at right angles to the direction of movement of the vehicles, whereby two parts of the coupling device are coupled together automatically when meeting head-on and whereby the said two parts can be uncoupled by turning the said coupling element about said pivotal axis, and said coupling device is characterised in that a drag lever is provided on one of the aforesaid two parts of the coupling which are coupled together automatically when meeting head-on and is mounted by means of a peg or the like engaged in a V-shaped guide slot, said lever, when the direction of movement of vehicles coupled by the coupling device is being reversed, rising on the floor or track and turning through a dead-centre postion, the aforesaid V-shaped guide slot being arranged in such a manner that, when changing direction from pulling to pushing, the peg or the like engages one arm of the V-shaped guide slot, as a result of which the coupling device takes up a temporary uncoupling position, whereas when changing direction from pushing to pulling, the peg or the like engages the other arm of the V-shaped guide slot, as a result of which the coupling device is prevented from taking up a temporary uncoupling position.

The invention is particularly suitable for remote-controlled toy vehicles, especially electrically driven model railways, in which the driving vehicles, particularly shunting locomotives, can be fitted with uncoupling mechanism constructed in accordance with this invention. The essential advantage of the invention consists of the fact that when the train reverses, the coupling takes up an only temporary uncoupling position and subsequently couples up again, as a result of which the portion of the train situated behind the driving vehicle or behind the coupling mechanism is, particularly when the train is pushed along a slope, prevented from breaking away.

FIGURES 1 to 13 of the accompanying drawings show, by way of example various embodiments of the invention.

FIGURES 9 and 10 show a coupling unit equipped with a drag hook in two different working positions, and FIGURE 11 the whole coupling device in the uncoupled position.

Figure 1:
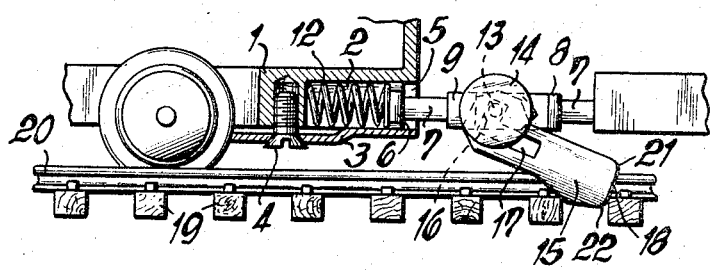
FIGURE 1 is a side view, partly in section, of a coupling having one-piece coupling halves.
Figure 2:
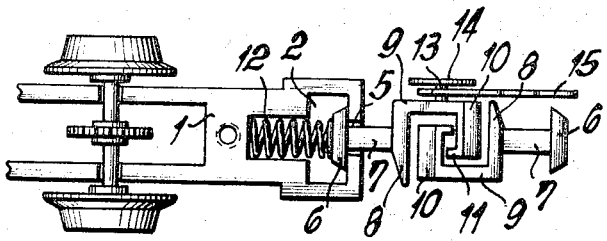
FIGURE 2 shows the coupling device, with uncoupling mechanism, illustrated in FIGURE 1 but from below.

Referring to the drawings, the reference 1 in FIGURES 1 to 4 represents a wheel-frame of a driving vehicle, provided with a T-shaped recess 2. This recess, which is accessible from below, is covered by a plate 3 which is affixed to the wheel-frame from below by means of a screw 4. An end of the wheel-frame 1 is provided with a gap 5. Inside the recess 2 lies a head 6 of a T-shaped projection consisting of the head 6 and a neck 7. The neck 7 extends into a vertical flange 8 which, in turn, extends into a vertical flange 9 parallel to the direction of movement. At right angles to part 9, and forming a continuation thereof, is a coupling nose 10 of triangular cross-section, carrying at its end a relatively short projection 11 at right angles to the nose and directed back. Parts 8 to 11 form a coupling hook which is supported from the recessed end of the frame 1 by means of the T-shaped projection 6, 7. A coil spring 12 is provided in the narrow part of the recess 2, the free extremity of which lies against the head 6 of the T-shaped projection 6, 7. The drawings show that due to a slight lateral clearance between gap 5 and neck 7, the coupling hook is capable of carrying out a certain swivelling movement to the right and left, and that it is returned to its centre position by the force exerted by spring 12. Moreover, the dimensions of the gap 5 are such that the coupling hook is also capable of pivoting upwards through a certain angle and that it is returned into its original horizonal position by the force exerted by spring 12. Furthermore, the drawings show that, if two vehicles equipped with such a coupling hook meet head-on, one of the two hooks gives way in an upward direction, thus arriving at the coupled position shown in FIGURES 1 and 2. FIGURE 2 also shows that, due to the projections 11, uncoupling caused by the two coupling halves giving way towards the sides cannot take place.

The left coupling half is fitted, for instance, to a driving vehicle, and the identical right half to a driven vehicle. Therefore, in such a case any movement to the left is a forward (pulling) movement, and to the right a reverse (pushing) movement. The driving vehicle coupling carries a peg 13 situated approximately in the centre of flange 9, the extremity of which is provided with a relatively large, flat disc 14. The peg 13 carries a drag lever 15 with a V-shaped slot 16, 17. The short arm 16 of the slot is approximately at right angles to the length of the drag lever and widens, somewhat at its end. The long arm 17 of the slot runs along the length of the drag lever. An edge 18 terminates the lower end of the drag lever and is at right angles to the length of the latter. The width of the drag lever at the bottom is slightly larger than the interval between two sleepers 19 of a track 20. The corners between the bottom edge 18 and the sides of the drag lever are bevelled, as shown at 21 and 22. The drag lever 15 is of strong, elastic plastics material.

Figures 3A, 3B, 3C:
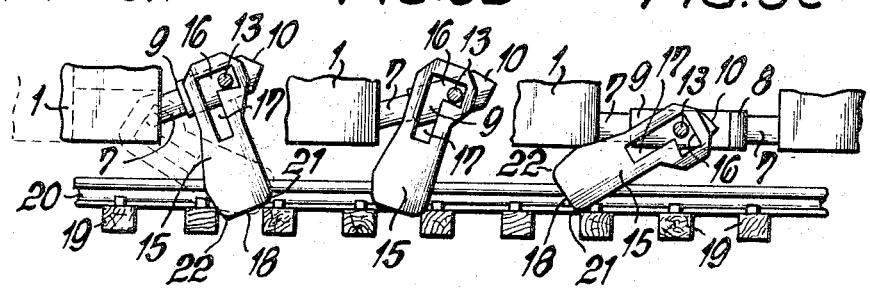
FIGURES 3A, 3B and 3C show the left hand coupling unit illustrated in FIGURES 1 and 2 with the uncoupling mechanism in various positions, seen from one side.
Figure 4:
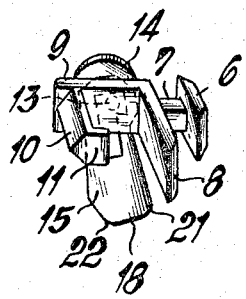
FIGURE 4 is a perspective view of the coupling hook, fitted with the uncoupling mechanism, illustrated in FIGURES 1 to 3.

The length of the slot portion 16 must be such that it is capable of retaining peg 13 when the driving vehicle reverses by a short distance, in which case the coupling hook takes up the position shown in FIGURE 3A. The length of the coupling hook is such that, as shown in FIGURE 3A, it is raised above the uncoupling position. When the vehicle continues to move to the right, the coupling hook and drag lever take up the positions shown in FIGURES 3B and 3C, and the left hand coupling hook again takes up its horizontal coupling position. When the driving vehicle moves again to the left, out of the position shown in FIGURE 3C the edge 18 of drag lever 15 comes to engage against one of the sleepers 19, and peg 13 enters the second arm 17 of the V-shaped slot. At the same time, the drag lever 15 again takes up the position shown by the interrupted lines in FIGURE 3A without, by so doing, raising the coupling hook.

The above-described coupling device thus makes it possible to uncouple the driving from the driven vehicle by means of a simple change of direction from pulling to pushing. If the pushing movement continues, the coupling is once again connected. When changing over from pushing to pulling, the coupling remains in position.

Figure 5:
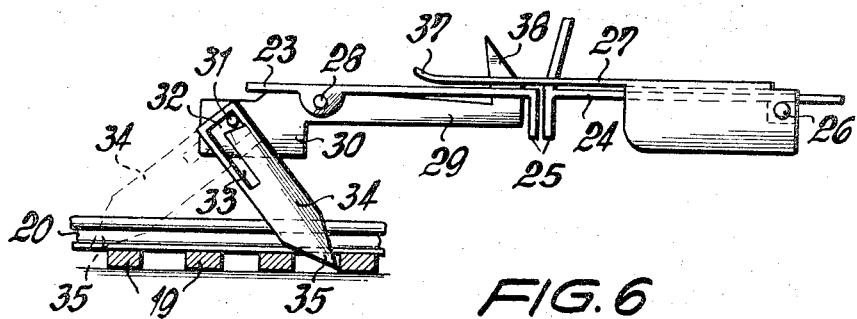
FIGURES 5 and 6 illustrate a second example of the uncoupling mechanism constructed in accordance with this invention, with a modified known coupling device, in side view, FIGURE 5 showing the mechanism when coupled and FIGURE 6 when uncoupled.
Figure 6:
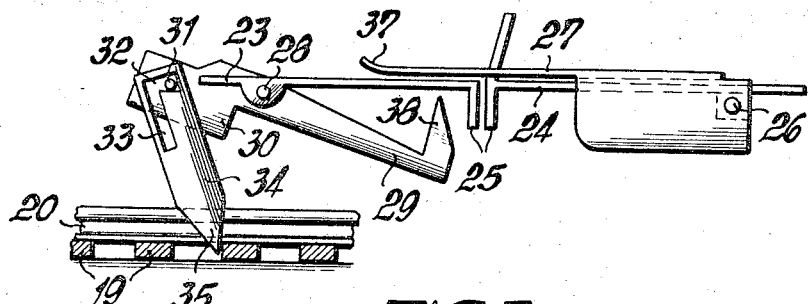

The example shown in FIGURES 5 and 6 represents a modified known asymmetrical coupling device with coupling units consisting of brackets and hooks. Here again, the left coupling unit is fitted to a driving vehicle, and the right coupling unit to a driven vehicle. The coupling units are fitted with coupling carriers 23 and 24 respectively, which are rigidly connected with the respective vehicles or capable of pivoting round vertical pivots on the respective vehicles. Those ends of these coupling carriers which face each other each have an angular part 25 pointing downwards and serving as a buffer. The coupling carrier 24 of the right hand, driven vehicle is fitted with a coupling bracket 27 capable of pivoting upward about a pin 26 and normally resting on top of the coupling carrier 24. The left hand extremity of bracket 27 protrudes to the left over the coupling carrier 24. The right hand extremity of the left hand coupling carrier 23 has an opening through which enters a coupling hook 29 capable of pivoting about a pin 28 attached to the coupling carrier 23. In the coupled position, bracket 27 of the right hand coupling unit overlaps the end of coupling hook 29 pointing upwards. The hook 29 is provided with a lever arm 30 pointing towards the left which carries on its side a pin 31. A flat drag lever 34 engages the pin 31 by means of a V-shaped guide slot 32, 33. The lower end of drag lever 34 is pointed as shown at 35. Because of a spring which is not shown, or of the weight of the lever arm 30, the hook 29, 30 normally takes up the horizontal position shown in FIGURE 5 in which its right hand part 29 engages the bottom of coupling carrier 23. When the vehicles with the coupling units shown move head-on, a left hand, slightly bent, edge 37 of coupling bracket 27 hits a sloping edge 38 of coupling hook 29, causing the latter to pivot in a clockwise direction and to hook up with bracket 27. Uncoupling is effected, in the same manner as explained in respect of the previous example, by means of the drag lever 34, 35 fitted to coupling hook 29, 30. If the left hand, driving, vehicle moves from the position shown in FIGURE 5 by a certain distance towards the right, point 35 of the drag-lever comes to lie between two sleepers 19 to bring hook 29, 30 into the uncoupled position shown in FIGURE 6. If the driving vehicle moves again to the left, hook 29 disengages from bracket 27 and the coupling device is disconnected. During a reverse (pushing) movement of the driving vehicle from left to right, the drag lever 34, 35 takes up the position shown by the interrupted lines in FIGURE 5. After having stopped and when moving once more to the left, the drag lever 34, 35 moves into the position shown in full lines in FIGURE 5. By so doing, pivot 31 slides along slot 33 in such a manner as not to cause the coupling hook 29, 30 to pivot.

In the examples shown in FIGURES 1 to 4 and 5 and 6 respectively, bracket 6–11 or hook 29, 30 is provided with a fixed pivot pin 13 or 31 and with the comparatively wide and flat drag lever 15 or 34 with the V-shaped guide slot 16, 17 or 32, 33. It is of course also possible to provide the drag lever with a corresponding fixed peg, and the swivelling coupling arm with the V-shaped guide slot, in which case the two arms of the guide slot occupy a position which is reversed with respect to their position when provided in the drag lever. FIGURES 7 and 8 and 9 to 11 respectively show two such examples, but modified in such a manner that the guide slot is not provided directly in the coupling hook or bracket, but in an intermediate lever situated below the hook or bracket.

Figure 7:
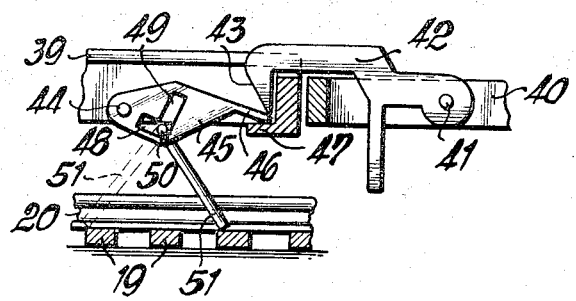
FIGURES 7 and 8 illustrate a third example of the uncoupling mechanism with another modified known coupling device, in side view, partly in section, FIGURE 7 showing the mechanism when coupled and FIGURE 8 when uncoupled.
Figure 8:
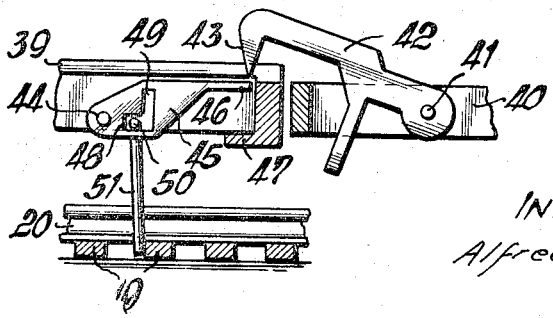

In the example shown in FIGURES 7 and 8, each of the two coupling units consists of a bracket 39 and 40, which is either rigidly connected to the vehicle or is capable of pivoting about a vertical pivot on the vehicle. The bracket 40 on the driven vehicle is fitted with a coupling hook 42 capable of pivoting round a horizontal pivot 41. This hook overlaps the bracket 39 on the driving vehicle when in the coupled position. The vertical surfaces of brackets 39 and 40 facing each other serve as disc buffers, and the drawings show that when the two vehicles move head-on, the coupling hook 42, due to its bevelled surface 43, pivots upwards when coming into contact with bracket 39, and subsequently hooks up with the latter. In order to uncouple when changing direction, a lever 45 capable of pivoting round pivot 44 is fitted to bracket 39. In the rest position, a flat right hand end 46 of lever 45 lies on top of a ledge 47 on the bracket 39, below the tip of the coupling hook 42. The lever 45 has a V-shaped slot 48, 49 from which a drag lever 51 is supported by means of a horizontal peg 50. The operating procedure is the same as that in respect of the previous examples. When changing direction from pushing to pulling from right to left, peg 50 in slot portion 49 slides upwards, so as not to disconnect the coupling device. When changing direction from pulling to pushing from left to right, peg 50 is transferred to the short slot portion 48 and raises lever 45 by such a distance that when the left hand, driving, vehicle moves again to the left, hook 42 releases coupling bracket 39. It is of course understood that the intermediate lever 45, 46 can be fitted with a hook which overlaps bracket 40, enabling it to be used for direct coupling and uncoupling, without hook 42.

Figure 9:
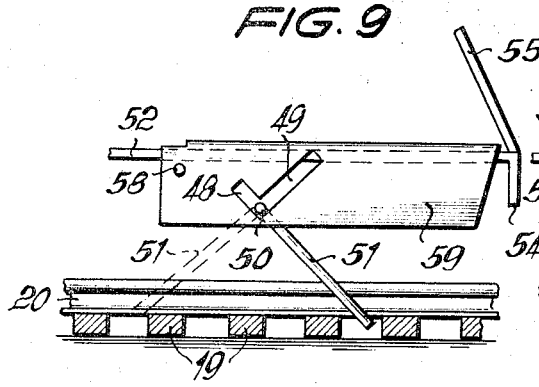
FIGURES 9 to 11 illustrate a fourth example of the uncoupling mechanism in side view.
Figure 10:
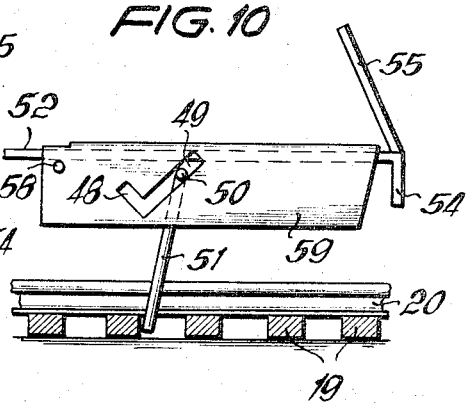
Figure 11:
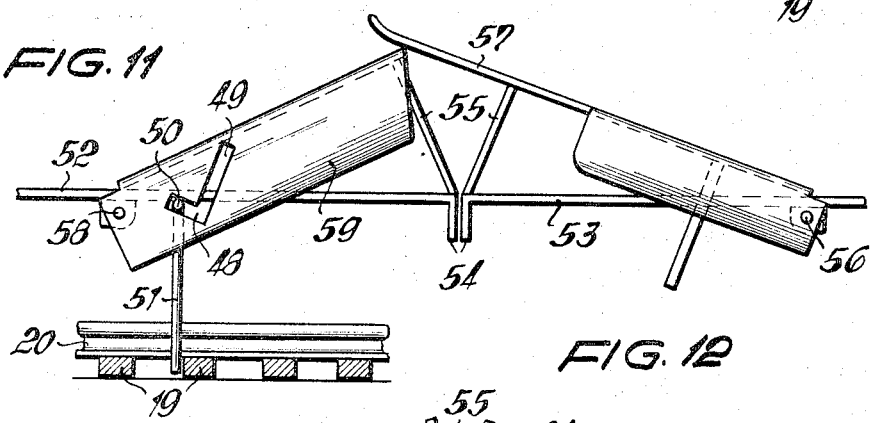

FIGURES 9 to 11 show an example similar to that shown in FIGURES 7 and 8. The driving and driven vehicles are fitted with the identical coupling units 52 and 53 respectively, which are either rigidly connected with the respective vehicles or capable of pivoting about vertical pivots. The angular projections 54 serve as buffers, and horn 55 pointing upwards at an angle acts as a coupling hook. The right hand coupling unit 53 on the driven vehicle carries a coupling bracket 57 which is capable of pivoting about a pivot 56, and the left hand extremity of which overlaps horn 55 of the left hand coupling unit 52 in the coupling position. The coupling unit 52 on the driving vehicle on the left, carries a lever 59 which is capable of pivoting about a pivot 58 and the right hand extremity of which lies below bracket 57 of the driven vehicle, on the right. Lever 59 is provided with a V-shaped guide slot 48, 49 from which a drag lever 51 is supported by a peg 50, as in the case of the previous example. The operating procedure of this device is the same as for the previous example. FIGURE 9 shows in full lines the position of the drag lever during a pulling movement towards the left, and the interrupted lines represent the position of the drag lever during pushing towards the right. FIGURE 10 shows the position of the drag lever when changing from a right hand to a left hand movement, and FIGURE 11 shows the coupling position when changing from a left hand to a right hand movement after having moved over a short distance. The drag lever 51, with the peg 50 resting in arm 48, has raised the lever 49 to such an extent that bracket 57 is lifted above horn 55 of the left hand coupling unit. The driving left hand vehicle can thus be disconnected from the right hand vehicle when moving again to the left. Here too, the lever 59 fitted with the V-shaped guide slot can be made in the form of a coupling hook or bracket.

Figure 12:
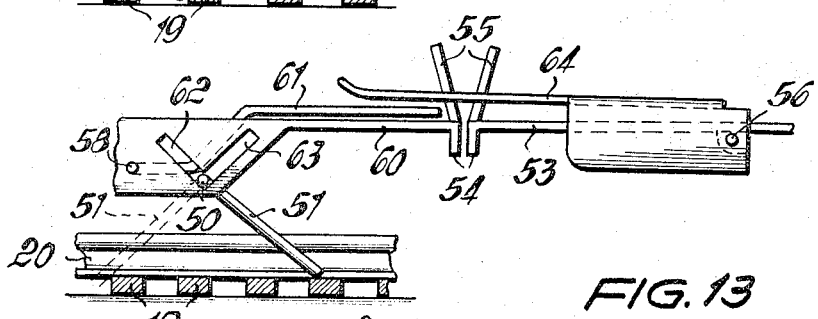
FIGURES 12 and 13 illustrate a fifth example of the uncoupling mechanism, in side view, FIGURE 12, showing the mechanism when coupled and FIGURE 13 when uncoupled.
Figure 13:
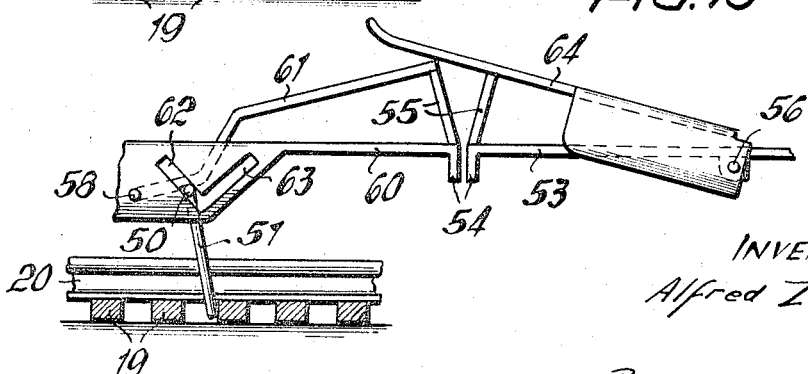

In a further embodiment of the invention the V-shaped guide slot is provided in a coupling unit incapable of pivoting in a vertical direction, and a lever for bringing about the coupling and uncoupling operations crosses the "pulling" arm of the slot and an extension of a peg attached to the drag lever and sliding in the guide slot is arranged to lie below this lever. FIGURES 12 and 13 show such an example, using an intermediate lever bringing about the uncoupling operation.

In the example illustrated in FIGURES 12 and 13, the coupling unit 53 on the right hand, driven vehicle is practically identical with the right hand coupling unit shown in FIGURE 11. The coupling element 60 on the left hand coupling unit, fitted to the driving vehicle, is incapable of pivoting in a vertical direction and receives a doubly-cranked lever 61 which is capable of pivoting about peg 58 and which, as shown in FIGURE 12, normally rests on top of element 60. The latter has a V-shaped slot which consists of approximately equal long arms 62 and 63 and which is engaged by a peg 50 on a drag lever 51. The arm 63 of the slot lies below the lever 61 shown in its rest position in FIGURE 12. Whereas the arm 62 of the slot crosses the lever 61 approximately at right angles and peg 50 is made long enough in order to lie below lever 61. It is readily appreciated that when changing direction from pushing to the right to pulling to the left, the coupling device is not disconnected. On the other hand, when changing direction from pulling towards the left to pushing towards the right, the peg 50 raises the lever 61, as a result of which the latter disengages bracket 64 from horn 55 on the left hand coupling unit 60. Here too, lever 61 can be made in the form of a coupling hook or bracket.

In the examples illustrated in FIGURES 1 to 13, the left hand, driving vehicle is provided with the drag lever and the V-shaped guide slot. However, it is equally possible for the driven vehicle to be provided with the said lever and groove. But care must be taken in this instance that in the examples shown in FIGURES 1 to 11 the position of the short arm of the V-shaped slot is on the opposite side to that shown, and the right hand vehicle becomes the driving vehicle, and the left hand one the driven vehicle. It will be noted that when changing direction from pulling towards the right to pushing towards the left, the coupling device takes up a temporary upcoupled position and when changing direction from pushing towards the left to pulling towards the right, the coupling device is not disconnected. In the examples illustrated in FIGURES 12 and 13, lever 61 with is axis of rotation 58 must be positioned in relation to the V-shaped slot 62, 63 in such a way that when peg 50 connected to drag lever 51 slides in arm 62 of the slot, lever 61 is not raised, but is lifted up when peg 50 slides in arm 63. In this case, the axis of rotation 58 of lever 61, for instance, can be situated between the two arms 62 and 63, and the shape of lever 61 be such that it crosses arm 63 of the slot near its lower end.

The drag lever shown in the various examples may consist of any material. It is made preferably of an insulating, more or less elastic material so as to prevent, in the case of electric model railways, short circuits from occurring when the train runs over switch points or intersections. Its length, relative to that of one arm of the V-shaped guide slot, is such that when passing the dead centre, the coupling unit bringing about the uncoupling operation is safely taken into the uncoupled position, but preventing the vehicle itself from being lifted up. The other arm of the V-shaped guide groove must be such that the peg is capable of moving along it without bringing the coupling device into the uncoupled position.

I claim:

1. In combination with a vehicle of a toy and model railroad, a coupling for coupling the vehicle to a similar vehicle, said coupling including: a coupling member pivotable about a horizontal axis extending in a direction transverse to the direction of movement of the vehicle, a drag lever member pivotally connected to said coupling member, one of said members being provided with a V-shaped guide slot and the other one of said members being provided with pin means in movable engagement with said slot thereby establishing said pivotable connection between said two members, said drag lever member having such a length as to be adapted to drag on stationary means on the ground adjacent said vehicle, and said V-shaped slot having such a length and being so shaped as to permit said drag lever member to tilt from a first dragging position in which it defines an acute angle with the horizontal plane through an intermediate temporary uncoupling position to a second dragging position in which said drag lever member defines an obtuse angle with said horizontal plane, and vice versa, whereby when changing direction from pulling to pushing said pin means engaging one arm of said V-shaped slot so that said coupling device takes up a temporary uncoupling position, whereas when changing direction from pushing to pulling said pin means will engage the other arm of said V-shaped slot so that the coupling device is prevented from taking up a temporary uncoupling position.

2. A coupling device, as claimed in claim 1, wherein the V-shaped guide slot is provided in the drag lever member and consists of a relatively-short arm which points towards the "pushing" direction when the drag lever is in a raised position, and a relatively-long arm which points downwards.

3. A coupling device, as claimed in claim 1, having two coupling hooks which are each mounted in a mounting so as to be able to pivot horizontally as well as vertically and which, when meeting head-on, are coupled to each other by coupling noses with which they are provided, one of said hooks, preferably that on the driving vehicle, carrying the drag lever member, said last-mentioned hook having thereon, forwards of the mounting of said hook, the pin means engaged in the V-shaped guide slot, said slot being provided in said drag lever member.

4. A coupling device, for toy or model vehicles, which has at least one coupling element mounted for pivoting about a horizontal pivotal axis disposed at right angles to the direction of movement of the vehicles, whereby two parts of the coupling device are coupled together automatically when meeting head-on and whereby the said two parts can be uncoupled by turning the said coupling element about said pivotal axis, characterized in that a drag lever is provided on one of the aforesaid two parts of the coupling which are coupled together automatically when meeting head-on and is mounted by means of a peg or the like engaged in a V-shaped guide slot, said lever, when the direction of movement of vehicles coupled by the coupling device is being reversed, rising on the floor or track and turning through a dead-centre position, the aforesaid V-shaped guide slot being arranged in such a manner that, when changing direction from pulling to pushing, the peg, or the like engages one arm of the V-shaped guide slot, as a result of which the coupling device takes up a temporary uncoupling position, whereas when changing direction from pushing to pulling, the peg or the like engages the other arm of the V-shaped guide slot, as a result of which the coupling device is prevented from taking up a temporary uncoupling position.

5. A coupling device, as claimed in claim 4, wherein the

V-shaped guide slot is provided, with its apex pointing downwards, in a lever for effecting the uncoupling operation, the peg or the like, which engages said guide slot, being provided on the drag lever, and said guide slot having a relatively-short arm pointing in the "pulling" direction and a relatively long arm pointing upwards.

6. A coupling device, as claimed in claim 4, wherein the V-shaped guide slot is provided, with its apex pointing downwards, in a element of one of the two parts of the coupling device, said element being unable to turn vertically and having pivoted thereto an uncoupling lever which effects the uncoupling operation, said uncoupling lever crossing approximately at right angles only one arm of the V-shaped guide slot, said arm pointing in the "pulling" direction, and the drag lever being provided with the peg or the like engaging the guide slot, said peg or the like engaging the aforesaid uncoupling lever from below.

References Cited
UNITED STATES PATENTS

| | | | |
|---|---|---|---|
| 403,341 | 5/1889 | Freeman | 213—211 |
| 1,887,753 | 11/1932 | Evans | 213—211 |
| 2,574,630 | 11/1951 | Edwards et al. | 213—212 |
| 2,631,740 | 3/1953 | Watson | 213—212 |

ARTHUR L. LA POINT, *Primary Examiner.*

DRAYTON E. HOFFMAN, *Examiner.*